(12) United States Patent
Oh et al.

(10) Patent No.: US 10,967,840 B2
(45) Date of Patent: Apr. 6, 2021

(54) SYSTEM AND METHOD OF CONTROLLING BRAKING OF ELECTRIC VEHICLE

(71) Applicants: HYUNDAI MOTOR COMPANY, Seoul (KR); KIA MOTORS CORPORATION, Seoul (KR)

(72) Inventors: Ji Won Oh, Hwaseong-si (KR); Jeong Soo Eo, Hwaseong-si (KR); Young Joon Chang, Yongin-si (KR)

(73) Assignees: Hyundai Motor Corporation, Seoul (KR); KIA Motors Corporation, Seoul (KR)

( * ) Notice: Subject to any disclaimer, the term of this patent is extended or adjusted under 35 U.S.C. 154(b) by 243 days.

(21) Appl. No.: 15/803,159

(22) Filed: Nov. 3, 2017

(65) Prior Publication Data

US 2018/0141528 A1  May 24, 2018

(30) Foreign Application Priority Data

Nov. 24, 2016  (KR) .......................... 10-2016-0157105

(51) Int. Cl.
*B60T 8/26* (2006.01)
*B60W 10/18* (2012.01)
(Continued)

(52) U.S. Cl.
CPC .......... *B60T 8/267* (2013.01); *B60T 8/17551* (2013.01); *B60W 10/08* (2013.01); *B60W 10/184* (2013.01); *B60W 30/02* (2013.01); *B60W 30/18109* (2013.01); *B60W 30/18127* (2013.01); *B60T 2270/604* (2013.01); *B60T 2270/613* (2013.01); *B60W 40/10* (2013.01); *B60W 2520/10* (2013.01); *B60W 2520/14* (2013.01); *B60W 2520/26* (2013.01);
(Continued)

(58) Field of Classification Search
CPC ................ B60T 8/267; B60T 8/17551; B60W 30/18127; B60W 40/10; B60W 2520/10; B60W 2520/26; B60W 2520/28; B60W 2520/18
See application file for complete search history.

(56) References Cited

U.S. PATENT DOCUMENTS 7,426,975 B2 *  9/2008  Toyota ................... B60K 6/445
                                                     180/165
7,458,650 B2 * 12/2008  Toyota ..................... B60K 6/40
                                                     303/151
(Continued)

*Primary Examiner* — Bradley T King
*Assistant Examiner* — James K Hsiao
(74) *Attorney, Agent, or Firm* — Brinks Gilson & Lione

(57) ABSTRACT

The present disclosure provides a method of controlling braking of an electric vehicle in which friction braking force generated by a friction braking unit is applied to front wheels and regenerative braking force generated by a motor is applied to rear wheels includes: determining driver's request braking force by a controller based on a driver's braking-input value; detecting driving information and state information of the vehicle by a detection unit; and determining a braking mode of the vehicle that satisfies the driver's request braking force by the controller based on the detected information and information of running state of the vehicle obtained from the detected information. In addition, the present disclosure provides a system of controlling braking of an electric vehicle.

14 Claims, 11 Drawing Sheets

(51) Int. Cl.
*B60W 30/02* (2012.01)
*B60W 10/184* (2012.01)
*B60W 30/18* (2012.01)
*B60W 10/08* (2006.01)
*B60T 8/1755* (2006.01)
*B60W 40/10* (2012.01)

(52) U.S. Cl.
CPC ..... *B60W 2520/28* (2013.01); *B60W 2540/12* (2013.01); *B60W 2540/18* (2013.01); *B60W 2710/083* (2013.01); *B60W 2710/18* (2013.01); *B60W 2720/403* (2013.01)

(56) References Cited

U.S. PATENT DOCUMENTS

| | | | |
|---|---|---|---|
| 8,388,071 B2 * | 3/2013 | Yokoyama | B60T 1/10 180/65.21 |
| 8,688,292 B2 * | 4/2014 | Miyata | G06F 17/00 701/1 |
| 8,924,116 B2 * | 12/2014 | Yamada | B60T 8/243 340/435 |
| 9,266,511 B2 * | 2/2016 | Pihl | B60T 13/586 |
| 2002/0030408 A1 * | 3/2002 | Niwa | B60K 6/44 303/152 |
| 2002/0180266 A1 * | 12/2002 | Hara | B60K 6/52 303/152 |
| 2003/0062770 A1 * | 4/2003 | Sasaki | B60T 8/00 303/152 |
| 2005/0269875 A1 * | 12/2005 | Maki | B60L 7/26 303/152 |
| 2006/0055240 A1 * | 3/2006 | Toyota | B60K 6/40 303/152 |
| 2006/0196712 A1 * | 9/2006 | Toyota | B60K 6/445 180/165 |
| 2007/0018499 A1 * | 1/2007 | Kokubo | B60K 6/445 303/151 |
| 2009/0229402 A1 * | 9/2009 | Khan | B60T 1/10 74/512 |
| 2009/0256417 A1 * | 10/2009 | Ishii | B60T 8/267 303/152 |
| 2010/0113215 A1 * | 5/2010 | Jager | B60L 7/26 477/29 |
| 2013/0062930 A1 * | 3/2013 | Muntu | B60T 8/17555 303/3 |
| 2013/0076113 A1 * | 3/2013 | Pihl | B60T 13/586 303/3 |
| 2014/0333123 A1 * | 11/2014 | Kunz | B60L 7/26 303/3 |
| 2015/0274159 A1 * | 10/2015 | Lu | B60T 8/171 701/82 |
| 2015/0291038 A1 * | 10/2015 | Akiyama | B60L 3/102 701/22 |
| 2016/0167527 A1 * | 6/2016 | Jeon | B60L 7/26 701/70 |
| 2016/0339779 A1 * | 11/2016 | Lauffer | B60W 20/13 |

* cited by examiner

SYSTEM AND METHOD OF CONTROLLING BRAKING OF ELECTRIC VEHICLE

CROSS-REFERENCES TO RELATED APPLICATION

The present application claims priority to and the benefit of Korean Patent Application No. 10-2016-0157105, filed on Nov. 24, 2016, which is incorporated herein by reference in its entirety.

FIELD

The present disclosure relates to a system and a method of controlling braking of an electric vehicle, and more particularly, to a system and a method of controlling braking of an electric vehicle.

BACKGROUND

The statements in this section merely provide background information related to the present disclosure and may not constitute the related art.

Generally, a hybrid vehicle refers to a vehicle being driven by an internal combustion engine (ICE) that uses fossil fuel and an electric motor that uses electric energy, which are used as a power source.

As for a type of a power train for hybrid vehicles, a transmission mounted electric device (TMED) type in which a drive motor is disposed at a transmission side is known.

In a typical TMED type, an engine clutch is interposed between an engine and a drive motor, which serve as power sources, a transmission is disposed at an output side of the drive motor, and a combined power of the engine and the drive motor is transmitted to front wheels acting as driving wheels via the transmission when the engine clutch is engaged.

Further, in TMED type hybrid vehicles, the engine and the drive motor are disposed at the front wheels acting as drive wheels so that only the drive torque for the front wheels is controlled in such a manner that torque of the engine and torque of the drive motor are overlaid before the transmission and then transmitted to the front wheels through the transmission.

In addition, a rear-axle mounted electric device (RMED) type is known as another type of hybrid vehicle. In the RMED type hybrid vehicles, front wheels are driven by power from the engine and rear wheels are driven by power from the electric motor.

This RMED type hybrid vehicles adopt a four-wheel drive (4 WD) system. U.S. Pat. No. 7,517,298 discloses an electric-4 WD (E-4 WD) type hybrid vehicle in which a propeller shaft which is a mechanical power unit is removed and a drive motor is applied to rear wheels in order to improve efficiency of the four-wheel drive vehicle.

As disclosed in the patent, in the hybrid vehicle to which the E-4 WD system is applied, independent driving means are applied to the front wheels and the rear wheels respectively wherein an engine is applied as a driving means for the front wheels and the drive motor is applied as a driving means for the rear wheels and each driving means is driven independently or together depending on conditions of driving environment.

On the other hand, in a case of a hybrid vehicle or a pure electric vehicle being driven by a motor being used as a power source, a regenerative mode for recovering kinetic energy of the vehicle through power generation by the motor at the time of braking or coasting by inertia and hence charging a battery (charging the motor) is performed.

Such a regenerative braking system improves vehicle fuel economy by converting kinetic energy of the vehicle into electric energy when the vehicle is braking and storing the electric energy in a battery and thereafter reusing the electric energy to drive the motor during running of the vehicle.

In vehicles where regenerative braking is performed, regenerative braking cooperative control technology for controlling the sum of regenerative braking torque generated in the motor during regenerative braking (i.e., regenerative braking force) and friction braking torque generated in brakes (i.e., friction braking force) to be equal to driver's request braking torque (i.e., target braking force) is required.

In this case, an appropriate distribution of the electric braking force generated by operation of the power generation and rotational resistance of the motor, that is, the regenerative braking force and the friction braking force generated by a friction braking unit is desired.

A hydraulic braking unit is used as a typical friction braking unit, wherein a target braking force, i.e., driver's request braking force is estimated based on signal of brakes corresponding to operation of brakes, i.e., signal of a brake pedal sensor (BPS) in response to operation of a brake pedal by a driver, and the distribution of the regenerative braking force and the hydraulic braking force (friction braking force), which satisfies the target braking force, is performed.

Further, when the regenerative braking torque and the hydraulic braking torque are determined through the distribution of the regenerative braking force generated by the motor and the hydraulic braking force generated by the hydraulic braking unit, control against the regenerative braking and the hydraulic braking (regenerative control of the motor and control of the hydraulic braking unit) is performed so as to output respective values of the distributed torque.

In the hybrid vehicle or the pure electric vehicle in which such regenerative braking is performed, it is desired to provide braking force to enhance fuel economy if it is possible to use the regenerative braking of the motor.

In this case, kinetic energy of the vehicle that can be consumed as heat in the friction braking unit during braking can be reduced and can be converted into electric energy through the motor so that a greater amount of electric energy can be stored in the battery and reused.

However, in a drive system in which the motor is mounted on the rear wheels, if regenerative braking is unconditionally given priority over using brakes of the front wheels, a greater braking force is applied to the rear wheels than the front wheels, resulting in a very unstable behavior of the vehicle.

However, if the greater braking force is always applied to the front wheels compared to the rear wheels similar to a strategy of using brakes in a general engine vehicle, an amount of energy discarded as heat in the brakes of the front wheels becomes greater than an amount of energy recovered through the regenerative braking of the rear wheels, resulting in an adverse effect on the fuel economy.

SUMMARY

The present disclosure provides a system and a method of controlling braking of an electric vehicle, which is capable of simultaneously improving vehicle fuel economy, braking stability and running stability by maximizing an amount of regenerative braking within a range in which the braking stability of the vehicle is provided.

In one aspect of the present disclosure, a method of controlling braking of an electric vehicle in which friction braking force generated by a friction braking unit is applied to front wheels and regenerative braking force generated by a motor is applied to rear wheels includes: determining, with a controller, driver's request braking force based on a driver's braking-input value; detecting, with a detection unit, driving information and state information of the vehicle; and determining, with the controller, a braking mode of the vehicle that satisfies the driver's request braking force based on the detected information and information of running state of the vehicle obtained from the detected information, wherein the braking mode includes: a regeneration priority mode for controlling regenerative braking of the motor so as to generate only the regenerative braking force satisfying the driver's request braking force without generating the friction braking force; and a stability priority mode for controlling the regenerative braking of the motor and operation of the friction braking unit such that distribution of the friction braking force and the regenerative braking force that satisfy the driver's request braking force is made based on an ideal braking distribution line and the distributed friction braking force and the distributed regenerative braking force are generated.

In another aspect of the present disclosure, a system of controlling braking of an electric vehicle in which friction braking force generated by a friction braking unit is applied to front wheels and regenerative braking force generated by a motor is applied to rear wheels includes: a detection unit configured to detect driving information and state information of the vehicle; and a controller configured to determine a braking mode of the vehicle based on the information detected by the detection unit and information of running state of the vehicle obtained from the detected information and controlling the regenerative braking of the motor and operation of the friction braking unit depending on the braking mode determined, where the braking mode includes a regeneration priority mode for controlling the regenerative braking of the motor so as to generate only the regenerative braking force satisfying driver's request braking force without generating the friction braking force; and a stability priority mode for controlling the regenerative braking of the motor and the operation of the friction braking unit such that distribution of the friction braking force and the regenerative braking force that satisfy the driver's request braking force is made based on an ideal braking distribution line and the distributed friction braking force and the distributed regenerative braking force are generated.

As such, according to the method and system of controlling braking of an electric vehicle in the present disclosure, the braking mode may be selected based on the driving information and the state information of the vehicle between the regeneration priority mode in which only the regenerative braking force for the rear wheels is generated and the stability priority mode in which distribution of the regenerative braking force and the friction braking force is made based on the ideal braking distribution line; and control for performing the selected mode is carried out, so that the amount of the regenerative braking is maximized through the regeneration priority mode within the range in which the braking stability is provided, thereby enhancing the fuel economy.

Further, based on the driving information and the state information, under the conditions where an unstable state of the vehicle behavior can occur, the system is switched to the stability priority mode such that the braking stability and the running stability of the vehicle can be provided.

Other aspects of the present disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
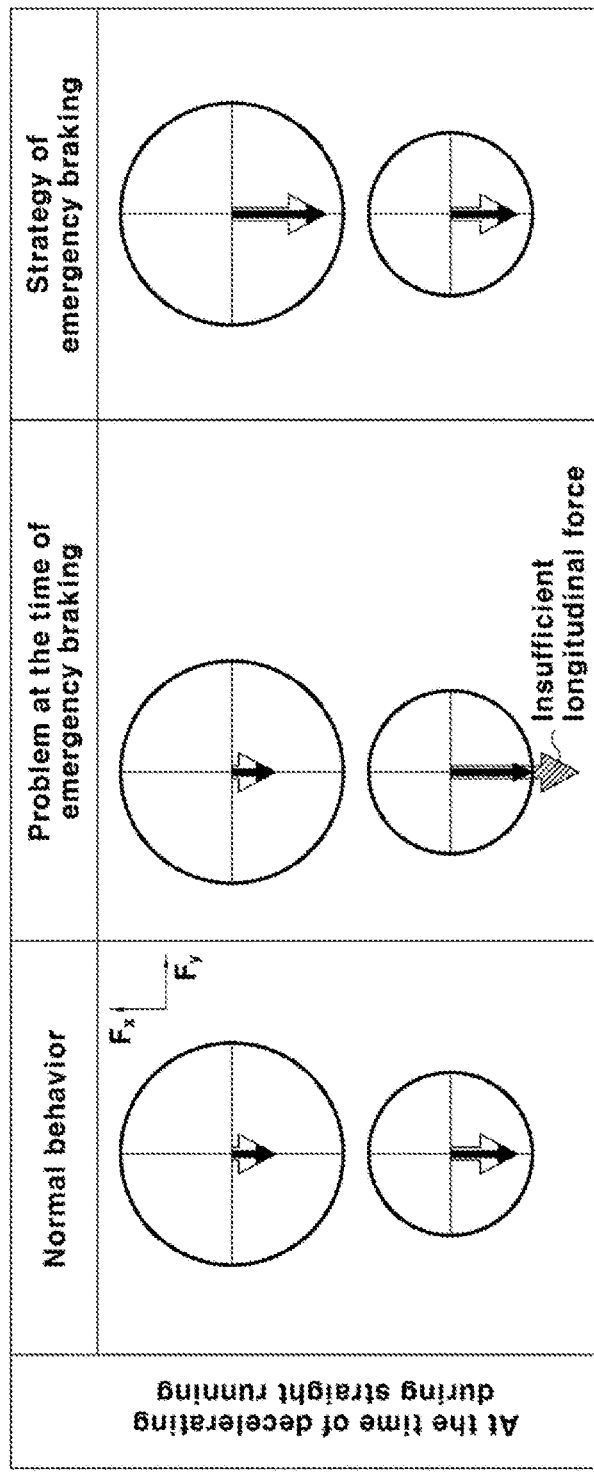
FIGS. 1 and 2 are diagrams showing when a general RMED type hybrid vehicle decelerates during straight running and decelerates during turning respectively.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
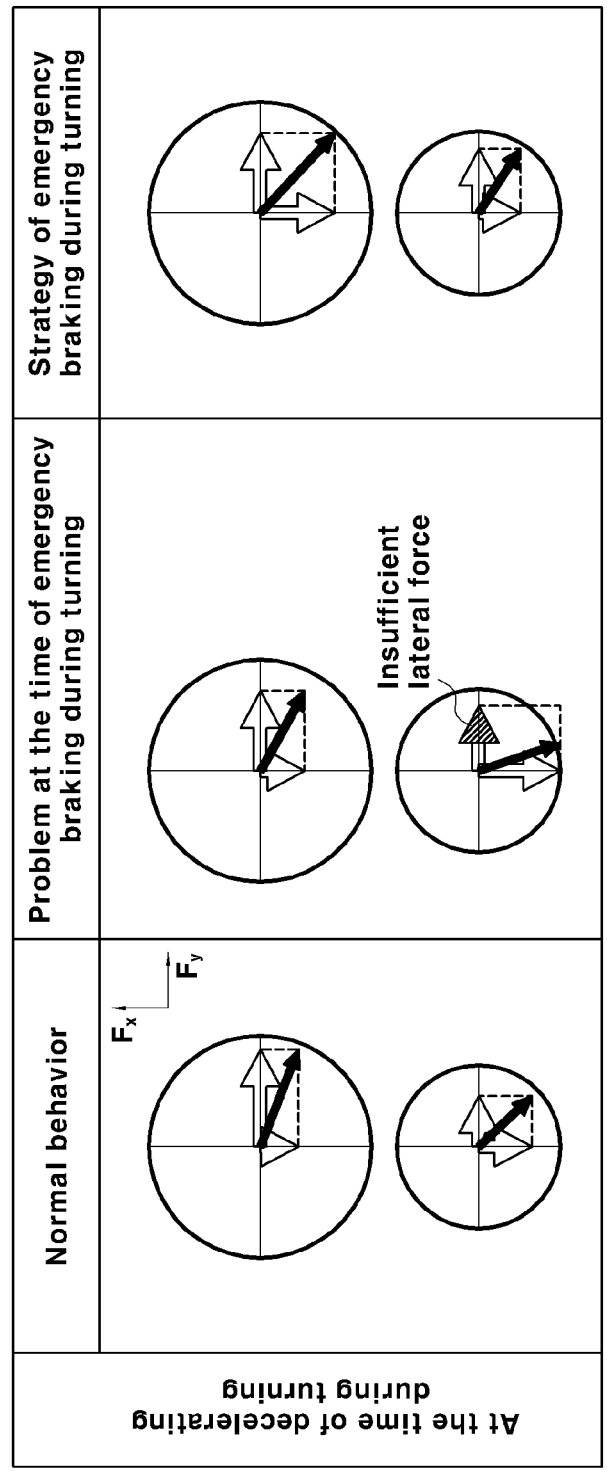

FIGS. 1 and 2 show a decelerating state during straight running and a decelerating state during turning respectively, wherein a circular friction circle is shown.

The term "friction circle" means a two-dimensional circle representing friction resistance of a tire of a vehicle. In the friction circle, grip force of the tire exerted against the road surface is represented by a sum vector (vector addition) of longitudinal force Fx and lateral force Fy which act on the road surface.

If the sum vector of the longitudinal force Fx and the lateral force Fy is smaller than the friction circle, only a very small slip occurs on the vehicle wheel. If the sum vector of the longitudinal force and the lateral force is larger than the friction circle, force capable of acting on the road surface is limited to force corresponding to the friction circle. Therefore, the force beyond the friction circle is used while idle, resulting in the occurrence of excessive slip.

The longitudinal direction refers to a direction parallel to a longitudinal direction of a vehicle body and the lateral direction refers to a direction parallel to a direction perpendicular to the longitudinal direction of the vehicle body.

Further, the longitudinal force Fx refers to force acting on the road surface in the longitudinal direction through the tire of the vehicle, while the lateral force Fy refers to force acting on the road surface in the lateral direction through the tire of the vehicle.

In the general RMED type vehicle, since an engine is mounted on the front wheels side, load of the front wheels is larger than that of the rear wheels and the friction circle of the front wheels (e.g., friction circles shown at the upper side in FIGS. 1 and 2) is larger than that of the rear wheels (e.g., friction circles shown at the lower side in FIGS. 1 and 2).

Further, when the vehicle is decelerating, shift of the load occurs in the vehicle, with the result that difference in the size of the friction circle between the front wheels and the rear wheels becomes much larger.

At this time, if the longitudinal force (deceleration force) of the rear wheels by the regenerative braking is forced to be increased in order to maximize the regenerative braking effect, the longitudinal force that can be provided from the rear wheels becomes small.

As shown in FIG. 1, if the target braking force that is the target force (i.e., force required for braking) is located within the friction circle even though the target braking force of the rear wheels is forced to be increased to enhance the regenerative braking at the time of deceleration during straight running, the vehicle shows normal behavior.

On the other hand, when the braking force greater than the friction circle is applied to the rear wheels to enhance the regenerative braking, the rear wheels are locked and hence, at the time of sudden braking, the target braking force of the rear wheels deviates out of the friction circle, with the result that the braking stability becomes unstable.

If friction coefficient of the road surface is low, the size of the friction circle is reduced and hence such a phenomenon becomes even worse.

In a possible situation where the longitudinal force is insufficient at the time of rapid braking as shown in FIG. 1, in order to resolve this, the target braking force of the front wheels must be forced to be increased such that both the target braking force of the front wheels and the target braking force of the rear wheels are located within the friction circle.

Further, when decelerating during turning, there is a limit in the sum of the longitudinal force Fx and the lateral force Fy of the tire that can be provided depending on friction circle of a tire and there is also a contradictory relationship between providing amount of the longitudinal force and that of the lateral force.

Therefore, if the longitudinal force (deceleration force) of the rear wheels by the regenerative braking is forced to be increased in order to enhance the regenerative braking effect, the lateral force that can be provided from the rear wheels becomes small.

Further, if lateral force that can be provided is smaller than a target lateral force of the rear wheels that is required for stable turning, grip force of the rear tire becomes insufficient, resulting in the occurrence of an oversteer phenomenon.

Referring to FIG. 2, at the time of normal behavior of the vehicle, all forces such as the target braking force and the lateral grip force of the tire are located within the friction circle even though the target braking force of the rear wheels is forced to be increased to enhance the regenerative braking.

However, at the time of emergency braking during turning, the target braking force and the lateral grip force of the rear wheels are located in the friction circle, but the sum vector may deviate out of the friction circle and behavior of the vehicle may become unstable by an amount corresponding to the difference between force that can be provided in the friction circle and the sum vector, that is, by insufficient lateral force.

Therefore, all forces such as the target braking force, the longitudinal force, the lateral force and the sum vector must be forced to be located within the friction circle by increasing the target braking force of the front wheels.

Figure 3:
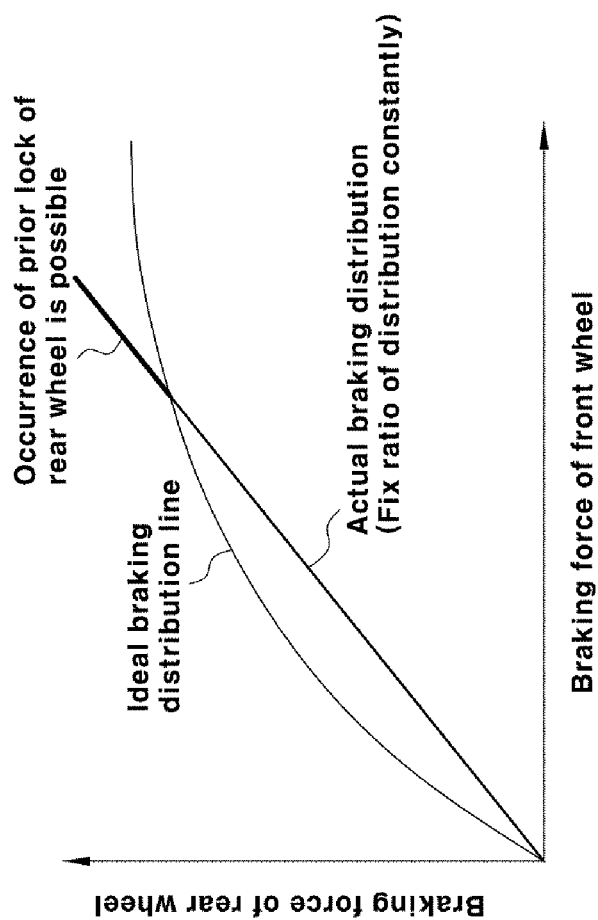
FIGS. 3 to 6 are graphs for explaining distribution of braking force to front and rear wheels.
Figure 4:
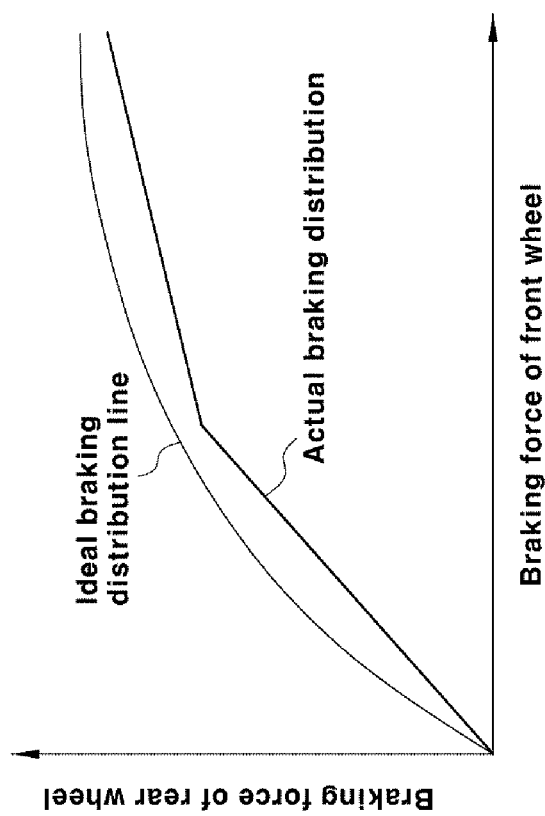

Next, FIGS. 3 to 6 show graphs for explaining a distribution of the braking force to front and rear wheels. FIGS. 3 and 4 show the graphs in general engine vehicles, not in hybrid vehicles.

FIG. 3 shows the graph in a vehicle which is not equipped with a proportioning valve while FIG. 4 shows the graph in a vehicle equipped with the proportioning valve serving to control hydraulic supply to a rear wheel braking unit.

Figure 5:
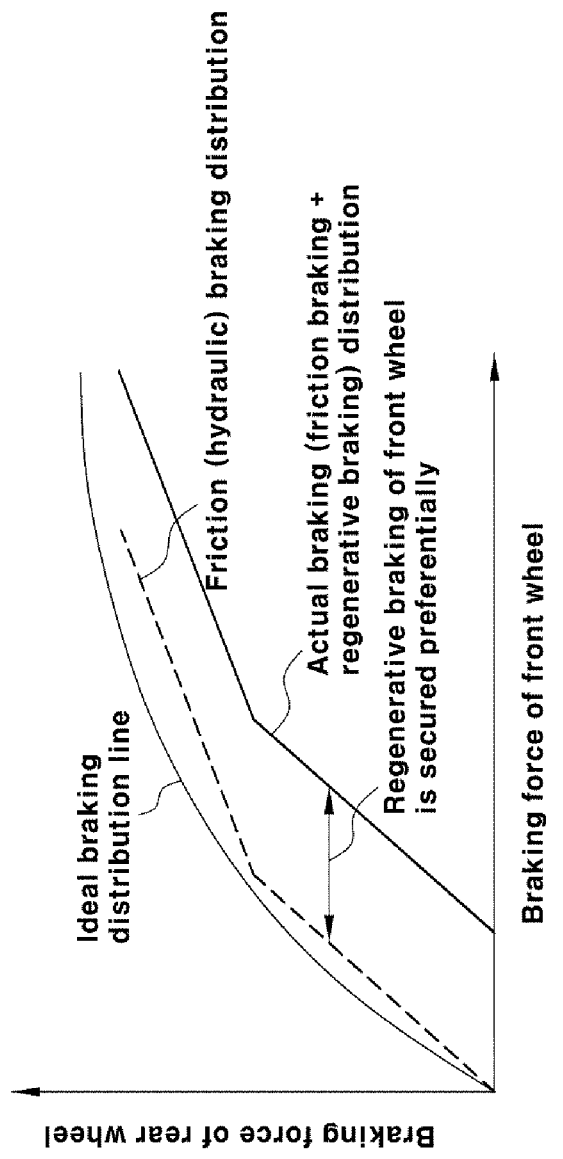
Figure 6:
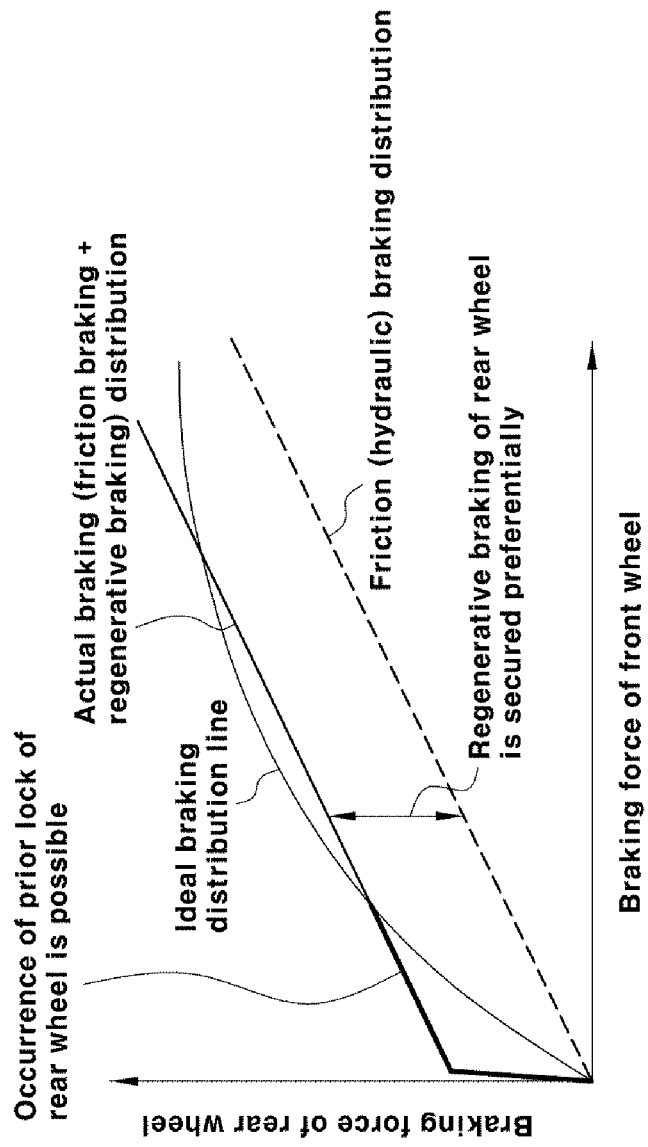

FIGS. 5 and 6 show the graphs in hybrid vehicles wherein FIG. 5 shows the graph in a hybrid vehicle in which regenerative braking of front wheels is performed and FIG. 6 shows the graph in a hybrid vehicle in which regenerative braking of rear wheels is performed.

An ideal braking distribution line in each of FIGS. 3 to 6 is a line on which ideal distribution of the braking force to the front and rear wheels is performed.

Referring to FIG. 3, in a conventional non-hybrid vehicle, since a fixed ratio of distribution of braking force to front and rear wheels is applied, an understeer tendency appears due to excessive braking force of the front wheels when small braking force of the vehicle is desired, whereas an oversteer tendency appears due to excessive braking force of the rear wheels when large braking force of the vehicle is desired.

Referring to FIG. 4, in order to overcome such a limitation caused by applying the fixed ratio of distribution of braking force to front and rear wheels, a proportioning valve is provided in a braking unit such that the distribution of the braking force that is always close to the ideal braking force distribution line is performed.

Referring to FIG. 5, in a hybrid vehicle in which regenerative braking of front wheels is performed, braking force is applied to the front wheels preferentially so as to increase the amount of the regenerative braking for improving fuel economy. In this case, an understeer tendency appears severely during braking.

Referring to FIG. 6, in a hybrid vehicle, in which regenerative braking of rear wheels is performed, braking force is secured on the rear wheels preferentially so as to increase the amount of the regenerative braking for improving fuel economy. In this case, an oversteer tendency appears severely during braking.

Conversely, if the ratio of the distribution of the braking force to the rear wheels is reduced in order to provide stability, an effect of the regenerative braking becomes insignificant, with the result that a problem of lowering the fuel economy is raised.

Accordingly, the present disclosure provides a system and a method of controlling braking of an electric vehicle, which is capable of simultaneously improving vehicle fuel economy, braking stability and running stability by maximizing an amount of regenerative braking within a range in which the braking stability of the vehicle is provided.

The present disclosure proposes a method of variably controlling regenerative braking torque in order to solve the contradictory relationship between the fuel economy of the vehicle and the braking stability and is characterized in that the regenerative braking torque is variably controlled, in particular, based on driving information and information of running state of the vehicle.

The system and method of controlling braking in the present disclosure can be applied to a vehicle in which regenerative braking is performed, that is, a vehicle in which regenerative braking force is generated by recovering energy through a motor to charge a battery and to an electric vehicle in which friction braking force and regenerative braking force are distributed during braking, more specifically an electric vehicle in which friction braking is performed on the front wheels and regenerative braking is performed on the rear wheels.

Here, the electric vehicle may include a pure electric vehicle (EV) having only a motor as a power source and driven only by power from the motor and a hybrid electric vehicle (HEV) having an engine and a motor and capable of being driven by power from the engine and power from the motor.

The electric vehicle refers to a pure electric vehicle in a narrow sense so as to be distinguished from a hybrid vehicle. In the present disclosure, however, the term "electric vehicle" is used in a broad sense to cover a pure electric vehicle as well as a hybrid vehicle and refer to a vehicle which includes at least one battery as a power source and is driven by a motor operated by electric energy stored in the battery and in which regenerative braking by the motor is performed.

For example, the present disclosure can be applied to a hybrid vehicle driven by an engine and a motor which are used as a power source of the vehicle as well as to an E-4 WD hybrid vehicle in which front wheels are driven by power from the engine and rear wheels are driven by power from the motor.

Further, the present disclosure can be applied to an RMED type E-4 WD hybrid vehicle in which regenerative braking is performed on rear wheels, and provides an effect of simultaneously satisfying improvement of fuel economy, braking stability and driving stability of the E-4 WD hybrid vehicle.

Hereinafter, the system and method of controlling braking according to the present disclosure will be described in detail.

The method of controlling braking in the present disclosure may be performed by cooperative control of a plurality of controllers in a vehicle, wherein the controller may be a vehicle controller (e.g., a hybrid control unit (HCU), a vehicle control unit (VCU)) which is a most top-level controller for controlling overall operation of the vehicle, a motor control unit (MCU) for controlling operation of a motor, a brake controller for controlling braking of the vehicle and the like.

Alternatively, the method of controlling braking in the present disclosure may be performed by a single integrated control means. In the following description, a plurality of controllers or a single integrated control means will be collectively referred to as a controller.

Figure 7:
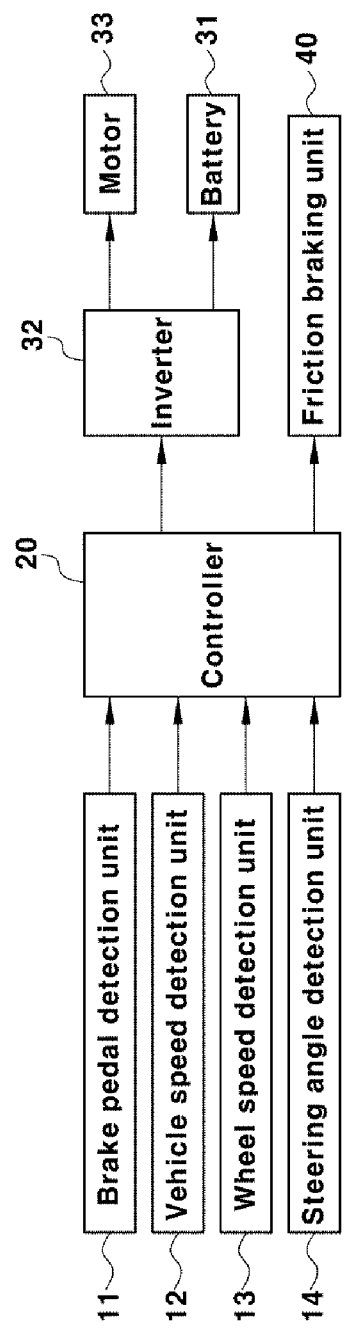
FIG. 7 is a block diagram showing a configuration of a system of controlling braking of a hybrid vehicle.

FIG. 7 is a block diagram showing a configuration of a system of controlling braking of a hybrid vehicle.

As shown in the figure, a system of controlling braking of a hybrid vehicle according to the present disclosure includes a detection unit for detecting driving information and state information of the vehicle and a controller 20 for determining a braking mode based on the information detected through the detection unit and information of running state of the vehicle obtained therefrom and controlling braking force of the vehicle.

In this case, the detection unit may include a brake pedal detection unit 11 for detecting operation state of a brake pedal, which is information of driver's braking input, a vehicle speed detection unit 12 for detecting vehicle speed, a wheel speed detection unit 13 for detecting wheel speed of front and rear wheels of the vehicle, and a steering angle detection unit 14 for detecting steering angle according to driver's steering wheel operation as information of driver's steering input.

In this case, the controller 20 determines driver's request braking force (target braking force) corresponding to the driver's brake operation state detected by the brake pedal detection unit 11, and determines the braking mode based on slip ratio of the rear wheels and target yaw rate, which are obtained from the detected values of the vehicle speed detection unit 12 and the wheel speed detection unit 13 and the detected value of the steering angle detection unit 14.

Further, the controller 20 controls regenerative braking of a motor and operation of a friction braking unit in accordance with the braking mode determined.

FIG. 7 illustrates a motor 33 for generating regenerative braking force for the rear wheels, an inverter 32 for driving and operating regeneratively the motor 33, a battery 31 connected in a chargeable and dischargeable manner via the inverter 32, and a friction braking unit 40 for generating friction braking force (hydraulic braking force) for the front wheels.

The brake pedal detection unit 11 is to detect a value of the driver's braking input and may be a typical brake pedal sensor (BPS) for outputting an electric signal in response to operating state of the brake pedal by the driver.

Further, the wheel speed detection unit 13 and the steering angle detection unit 14 may be a typical wheel speed sensor and a typical steering angle sensor respectively, which may have already been installed in vehicles.

The vehicle speed detection unit 12 is to detect running speed of the vehicle. Alternatively, only the wheel speed information detected by the wheel speed detection unit 13 may be used without using the vehicle speed information detected by a separate vehicle speed detection unit.

In this case, the wheel speed detection unit 13 includes sensors for detecting wheel speed of the respective wheels, i.e., the front wheels in addition to sensors for detecting wheel speed of the rear wheels.

In the present disclosure, as will be described later, the controller 20 calculates the slip ratio of the rear wheels on which regenerative braking is performed during running of the vehicle and uses the wheel speed information to calculate the slip ratio.

In this case, the controller 20 can calculate the slip ratio of the rear wheels based on the vehicle speed detected by the vehicle speed detection unit 12 and the wheel speed information of the rear wheels detected by the wheel speed detection unit 13. Alternatively, since the vehicle speed can be calculated from the wheel speed, the slip ratio of the rear wheels can be calculated from the wheel speed information of each wheel detected by the wheel speed detection unit 13, that is, wheel speed information of the front wheels and the rear wheels without using the vehicle speed.

For example, the slip ratio of the rear wheels can be calculated from the vehicle speed value, which is an average value of wheel speeds detected for each vehicle wheel, and the wheel speed value of the rear wheels.

Since the slip ratio of the vehicle wheels is information that has already been used as a parameter in various control logic for vehicles such as braking control, it can be mentioned that the calculation of the slip ratio of vehicle wheels as described above is a known technology. Therefore, a detailed description about this will be omitted herein.

Hereinafter, the controller 20 will be described with reference to the following control process.

Figure 8:
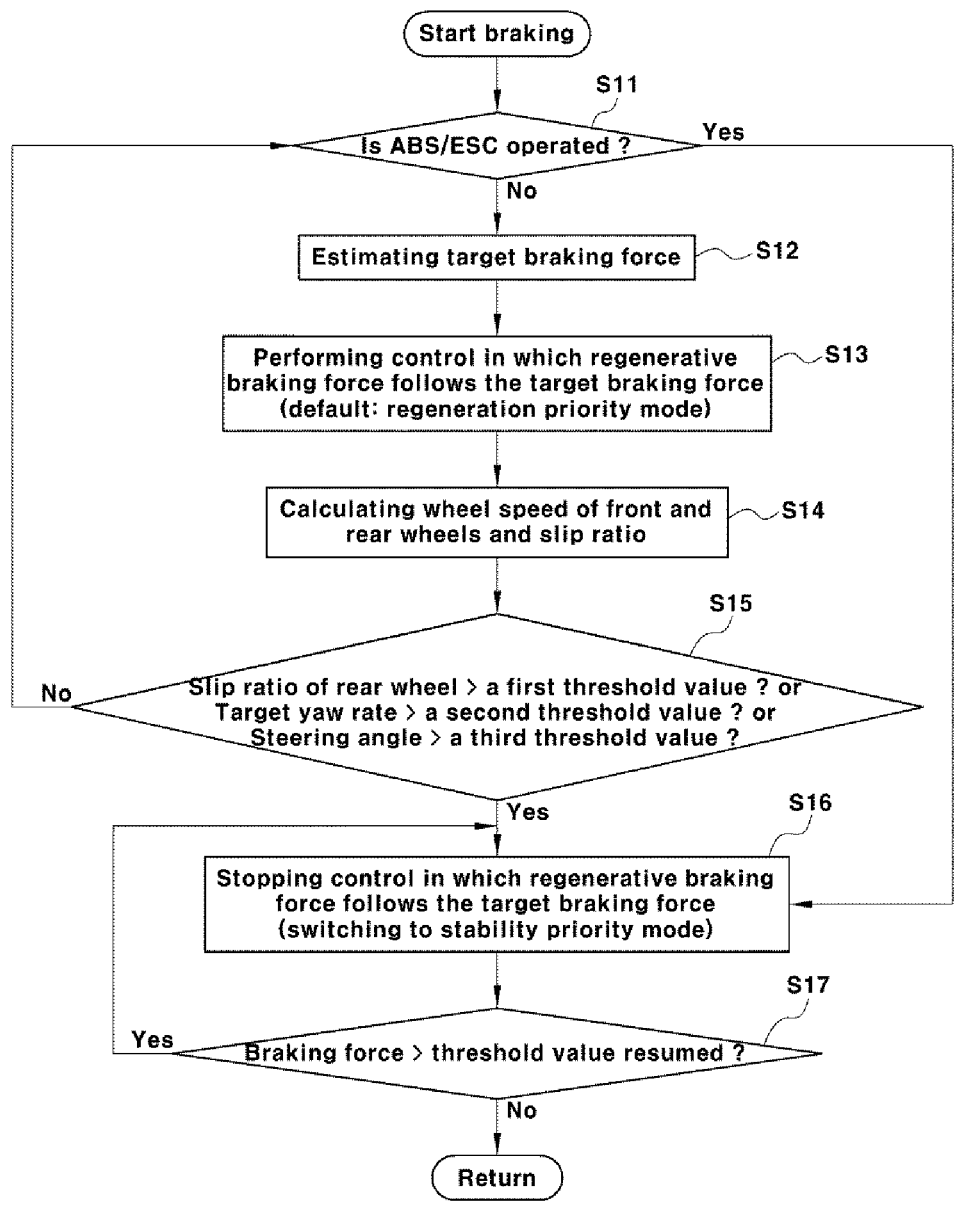
FIG. 8 is a flow chart showing a method of controlling braking of a hybrid vehicle.
Figure 9:
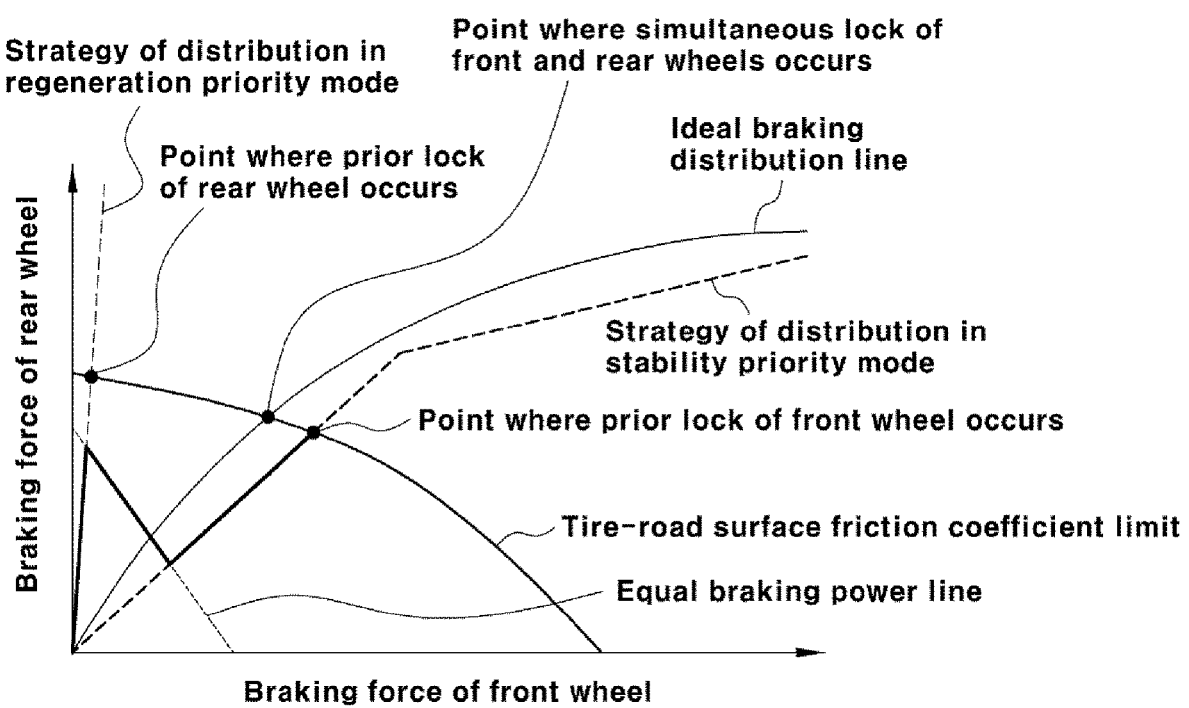
FIG. 9 is a graph illustrating switching of a braking mode by a method of controlling braking of a hybrid vehicle and a distribution state of braking force to front and rear wheels in response to the respective braking mode.

FIG. 8 is a flowchart showing the method of controlling braking of a hybrid vehicle and FIG. 9 is a diagram illustrating switching of a braking mode by the method of controlling braking of a hybrid vehicle and distribution state of braking force to front and rear wheels in response to the respective braking mode.

First, in the present disclosure, the braking mode performed by the controller 20 comprises two distinct modes, i.e., a regeneration priority mode and a stability priority mode. The controller 20 performs control to cause braking to be carried out in one mode of the regeneration priority mode and the stability priority mode.

The braking modes as described above are defined as follows:

The regeneration priority mode is a braking mode in which only the regenerative braking force by the motor 33 is generated to improve fuel economy and the regenerative braking force is applied only to the rear wheels but frictional braking force by the friction braking unit 40 is not generated.

The stability priority mode is a mode in which the regenerative braking force is generated such an extent that it does not exceed braking force of the rear wheels, which is distributed on the basis of the ideal braking distribution line, and applied to the rear wheels, in order to secure stability of the vehicle behavior preferentially, and in which while the regenerative braking using the motor 33 is performed for the rear wheels, the rest of braking force except for the regenerative braking force is generated through friction braking by the friction braking unit 40 (e.g., hydraulic braking) such that overall braking force (i.e., target braking force as the driver's request braking force) that must be generated in the vehicle in accordance with the driver's braking input operation is satisfied.

That is, in the stability priority mode, the overall braking force (i.e., target braking force) is distributed to the regenerative braking force by the motor 33 and the friction braking force by the friction braking unit 40 (for example, hydraulic braking unit) on the basis of the ideal braking distribution line, and the regenerative braking of the motor 33 and operation of the friction braking unit 40 are controlled such that the distributed regenerative braking force and friction braking force are generated.

Accordingly, in the stability priority mode, a ratio of the distribution of the braking forces to the front and rear wheels is determined at a level close to the ideal braking distribution line.

In the present disclosure, the braking mode is set to a default mode in which the regeneration priority mode out of the two braking modes is preferentially performed, and then the controller 20 switches the regeneration priority mode to the stability priority mode when a mode shift condition determined on the basis of driving information (e.g., steering angle) and running state information (e.g., slip ratio and target yaw rate) of the vehicle is satisfied.

Referring to the flowchart of FIG. 8, the controller determines whether an anti-lock brake system (ABS) and an electronic stability control system (ESC) are operated at step S11. The braking control process according to the present disclosure is not performed when ABS and ESC are operated, whereas the braking control process according to the present disclosure is performed only when both ABS and ESC are not operated.

When detecting operation of the brake pedal by the driver through the brake pedal detection unit 11, the controller 20 estimates target braking force corresponding to the brake pedal operating state detected by the brake pedal detection unit 11, that is, the driver's braking input value.

For example, when the driver operates the brake pedal, the controller 20 estimates, at step S12, driver's request braking force for braking the vehicle, i.e., the target braking force (i.e., target braking torque) based on signal of the brake corresponding to the brake operation state, that is, signal of the brake pedal detection unit 11 in response to the operation of the brake pedal.

The process of estimating the target braking force or the target braking torque is a well-known process and therefore a detailed description thereabout will be omitted in this specification.

Here, the target braking force refers to the driver's request braking force that is requested through operation of the brake pedal by the driver and means the overall braking force to be generated in the vehicle in response to the operation of the brake pedal.

When the target braking force is calculated as described above, the regeneration priority mode in which the target braking force is satisfied only by the regenerative braking force without distribution of braking force is performed under the condition that ABS and ESC are not operated, at step S13.

At this time, a motor torque command for the regenerative braking corresponding to the estimated target braking force, that is, a regenerative braking torque command is generated, and the regenerative operation of the motor 33 is controlled in accordance with the regenerative braking torque command, thereby applying the regenerative braking force following the target braking force to the rear wheels.

As described above, in the braking control process according to forms of the present disclosure, the regeneration priority mode is set to a default mode such that the regeneration priority mode is preferentially performed as shown in FIG. 9, and braking of the vehicle is performed only by the regenerative braking on the rear wheels and at the same time the battery 31 is charged by the regenerative braking.

On the other hand, even during the regeneration priority mode, if it is determined, based on the driving information and the running state information of the vehicle, that the vehicle is in a condition that slip may occur due to excessive regenerative braking force being applied to the rear wheels at the time of the current braking and lock of the rear wheels may occur due to the slip, or in a condition that control against the yaw rate of the vehicle greater than a certain level is required, the controller 20 switches the braking mode from the regeneration priority mode to the stability priority mode and performs control of the stability priority mode.

At this time, the controller 20 calculates the slip ratio of the rear wheels based on the wheel speed information at the time of braking and simultaneously calculates target yaw rate from the vehicle speed detected by the vehicle speed detection unit 12 and the steering angle detected by the steering angle detection unit 14.

Since the target yaw rate is information that has already been used as a parameter in various control logic for vehicles such as vehicle posture control and lane keeping control, it can be mentioned that the process of calculation of the target yaw rate is a known technology. Therefore, a detailed description about this will be omitted herein.

Then, it is determined whether to switch the braking mode based on information of the calculated slip ratio of the rear wheels or target yaw rate as well as information of the steering angle detected by the steering angle detection unit.

That is, if the slip ratio of the rear wheels is larger than a predetermined first threshold value, or the target yaw rate is larger than a predetermined second threshold value, or the steering angle detected by the steering angle detection unit 14 is greater than a predetermined third threshold value, the controller 20 switches the braking mode to the stability priority mode at steps S15 and S16 and stops the braking control in the regeneration priority mode in which the motor torque is forced to follow the target braking torque (i.e., the regenerative braking force is forced to follow the target braking force), and performs control of the stability priority mode in which distribution of the regenerative braking force and the frictional braking force is performed based on the ideal braking distribution line.

Here, the first, second, and third thresholds are values that can be set through test and evaluation process preceded in the vehicle development stage and used and the values are input to the controller 20 of the vehicle in advance after setting.

The first, second, and third threshold values can be set in consideration of a condition that when the regenerative braking force is applied only to the rear wheels in a vehicle to be developed, lock of the rear wheels may occur due to excessive slip, a condition that a yaw rate error (i.e., error between yaw rate value measured actually and target yaw rate value) is large due to unstable vehicle behavior when the vehicle is turning, a condition that control to a greater target yaw rate value is required, a condition close to the tire-road friction coefficient limit as shown in FIG. 9, and the like.

As described above, in the present disclosure, when the slip ratio, target yaw rate and steering angle of the rear wheels are monitored in real time while the braking force is controlled in the regeneration priority mode and they satisfy a predetermined condition, the braking mode is switched to the stability priority mode before a large yaw rate error or excessive slip occurs and thereby lock of the rear wheels occurs so that braking stability and running stability of the vehicle are secured.

After entering the stability priority mode, control of distribution of the braking force in the form of following the ideal braking distribution line as described above and braking control are performed.

In this way, in the present disclosure, the regeneration priority mode in which the braking force is provided only by the regenerative braking using the motor mounted on the rear wheels side during braking (the braking force being generated only on the rear wheels) is performed preferentially, and when the braking force is not close to the tire-road surface friction coefficient limit (i.e., point where prior lock of the rear wheels occurs) as shown in FIG. 9, enhancement of the regenerative braking and improvement of fuel economy are promoted through control of the regeneration priority mode.

Further, when the braking force is close to the tire-road surface friction coefficient limit, the braking control in the regeneration priority mode is stopped and stability of behavior of the vehicle is secured through the braking control in the stability priority mode.

An example to which the present disclosure is applied will be described with reference to FIGS. 10 and 11.

The longitudinal force Fx that is the longitudinal force of the tire and the lateral force Fy that is the lateral force of the tire, which can be generated simultaneously in the tire, have a contradictory relationship with each other. Therefore, a control strategy for determining whether to end the regeneration priority mode based on a fixed value of the slip ratio (i.e., first threshold value) using such a tire characteristic may be effective.

In the example of FIG. 9, it is determined whether to end the regeneration priority mode based on the slip ratio of 0.06 (which is the fixed value as the first threshold value). Therefore, if the vehicle is not in the cornering state (i.e., turning), the regeneration priority mode of the rear wheels is ended when the braking force of 3800 N is exerted.

However, if the slip angle $\alpha$ of 5° is allowed in order to provide lateral force Fy corresponding to 2800 N when entering the corner, the slip ratio of 0.06 is generated only by the braking force of 1900 N due to characteristics of the tire and hence the regeneration priority mode is ended.

Figure 10:
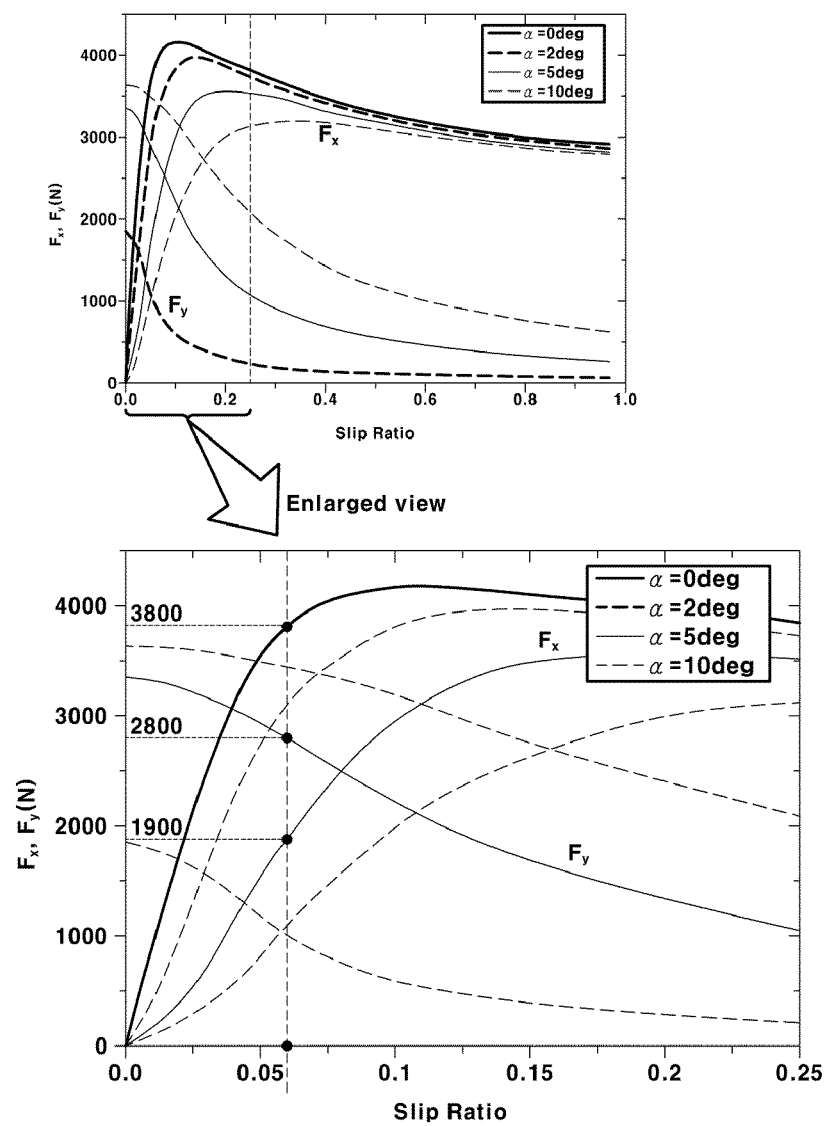
FIGS. 10 and 11 are graphs for explaining an example to which the method of controlling braking.
Figure 11:
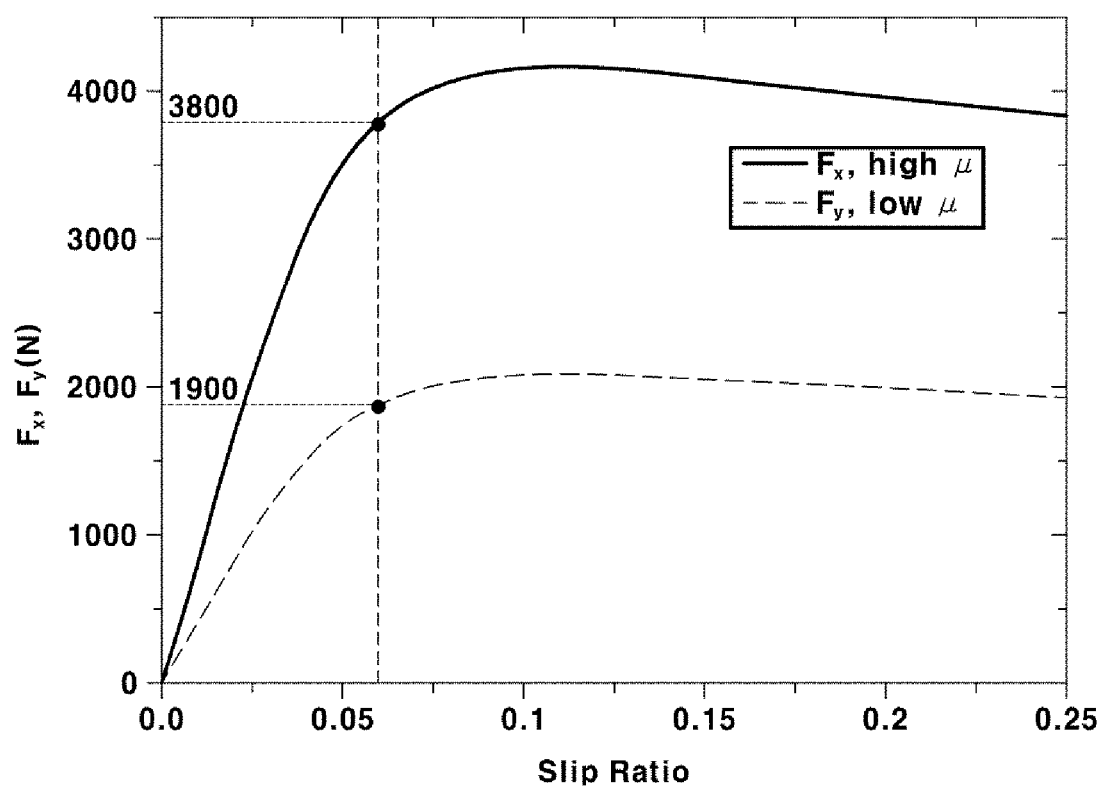

In the example of FIG. 10, it is determined whether to end the regeneration priority mode based on the slip ratio of 0.06. Therefore, the regeneration priority mode is ended when the braking force of 3800 N is exerted.

However, when the friction coefficient of the road surface is reduced, the slip ratio of 0.06 is generated only by the braking force of 1900 N and hence the regeneration priority mode is ended.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of controlling braking of a vehicle, wherein friction braking force generated by a friction braking unit is applied to front wheels of the vehicle and regenerative braking force generated by a motor is applied to rear wheels of the vehicle, the method comprising:
   determining, with a controller, a braking force based on a braking-input value of a driver, wherein the braking force is requested by the driver;
   detecting, with a detection unit, detected information of a vehicle, wherein the vehicle includes an electric vehicle, and wherein the detected information comprises driving information and state information of the vehicle; and
   determining, with the controller, a braking mode of the vehicle satisfying the braking force based on the detected information and information of a running state of the vehicle obtained from the detected information,
   wherein the braking mode comprises:
      a regeneration priority mode, wherein the regeneration priority mode controls regenerative braking of the motor to generate only the regenerative braking force satisfying the braking force without generating the friction braking force; and
      a stability priority mode, wherein the stability priority mode controls the regenerative braking of the motor and operation of the friction braking unit to generate the friction braking force and the regenerative braking force that are distributed, wherein distribution of the friction braking force and the regenerative braking force satisfying the braking force is performed based on an ideal braking distribution line,
   wherein the regeneration priority mode is set to a default mode in the controller, and the braking mode is switched abruptly to the stability priority mode from the regeneration priority mode immediately before lock of the rear wheels occurs at a point where prior to lock of the rear wheels occurs and at the same time the regeneration priority mode is turned off.

2. The method of claim 1, wherein detecting, with the detection unit, the detected information of the vehicle comprises:
   detecting, with a vehicle speed detection unit, vehicle speed;
   detecting, with a wheel speed detection unit, wheel speed of the vehicle; and
   detecting, with a steering angle detection unit, steering angle according to operation of a steering wheel by the driver.

3. The method of claim 2, wherein detecting, with the detection unit, the detected information of the vehicle further comprises:
   detecting, with a brake pedal detection unit, an operation state of a brake pedal, wherein the controller determines the braking force corresponding to the operation state of the brake pedal.

4. The method of claim 2, wherein the controller calculates a slip ratio of the rear wheels and a target yaw rate value, and determines the braking mode based on the steering angle, the slip ratio of the rear wheels, and the target yaw rate value, and
   wherein the slip ratio of the rear wheels and the target yaw rate value are information of a running state of the vehicle based on the vehicle speed and the wheel speed.

5. The method of claim 4, wherein, when the slip ratio of the rear wheels is greater than a first threshold value, the target yaw rate value is greater than a second threshold value, or the steering angle is greater than a third threshold value, the controller determines the stability priority mode as the braking mode and performs control of the stability priority mode.

6. The method of claim 1, wherein, when, during the regeneration priority mode, the detected information and the information of running state of the vehicle satisfy a predetermined condition, the controller switches the braking mode to the stability priority mode.

7. The method of claim 6, wherein the controller calculates the slip ratio of the rear wheels and the target yaw rate value, when, during the regeneration priority mode, the slip ratio of the rear wheels is greater than a first threshold value, the target yaw rate value is greater than a second threshold value, or the steering angle is greater than a third threshold value, and the controller switches the braking mode to the stability priority mode and performs control of the stability priority mode.

8. A system of controlling braking of a vehicle, wherein friction braking force generated by a friction braking unit is applied to front wheels of the vehicle and regenerative braking force generated by a motor is applied to rear wheels of the vehicle, the system comprising:
   a detection unit configured to detect detected information of the vehicle, wherein the vehicle includes an electric vehicle, and wherein the detected information comprises driving information and state information of the vehicle; and
   a controller configured to determine a braking mode of the vehicle based on the detected information and information of a running state of the vehicle obtained from the detected information and to control the regenerative braking of the motor and operation of the friction braking unit according to the braking mode to be determined,
   wherein the braking mode comprises:
     a regeneration priority mode, wherein the regeneration priority mode controls the regenerative braking of the motor to generate only the regenerative braking force satisfying a braking force without generating the friction braking force, wherein the braking force is requested by a driver; and
     a stability priority mode, wherein the stability priority mode controls the regenerative braking of the motor and the operation of the friction braking to generate the friction breaking force and the regenerative braking force that are distributed, wherein distribution of the friction braking force and the regenerative braking force satisfying the braking force is performed based on an ideal braking distribution line,
   wherein the regeneration priority mode is set to a default mode in the controller, and the braking mode is switched abruptly to the stability priority mode immediately from the regeneration priority mode before lock of the rear wheels occurs at a point where prior to lock of the rear wheels occurs and at the same time the regeneration priority mode is turned off.

9. The system of claim 8, wherein the detection unit comprises:
   a vehicle speed detection unit configured to detect vehicle speed;
   a wheel speed detection unit configured to detect wheel speed of the vehicle; and
   a steering angle detection unit configured to detect steering angle according to operation of a steering wheel by the driver.

10. The system of claim 9, wherein the detection unit further comprises:
    a brake pedal detection unit configured to detect an operation state of a brake pedal, wherein the controller is configured to determine the braking force corresponding to the operation state of the brake pedal.

11. The system of claim 9, wherein the controller is configured to calculate a slip ratio of the rear wheels and a target yaw rate value and to determine the braking mode based on the steering angle, the slip ratio of the rear wheels, and the target yaw rate value, and
    wherein the slip ratio of the rear wheels and the target yaw rate value are information of a running state of the vehicle based on the vehicle speed and the wheel speed.

12. The system of claim 11, wherein, when the slip ratio of the rear wheels is greater than a first threshold value, the target yaw rate value is greater than a second threshold value, or the steering angle is greater than a third threshold value, the controller is configured to determine the stability priority mode as the braking mode and to perform control of the stability priority mode.

13. The system of claim 8, wherein, when the regeneration priority mode is set to a default mode in the controller, and when, during the regeneration priority mode, the detected information and the information of running state of the vehicle satisfy a predetermined condition, the controller is configured to switch the braking mode to the stability priority mode.

14. The system of claim 13, wherein the controller is configured to calculate the slip ratio of the rear wheels and the target yaw rate value, when, during the regeneration priority mode, the slip ratio of the rear wheels is greater than a first threshold value, the target yaw rate value is greater than a second threshold value, or the steering angle is greater than a third threshold value, and the controller is configured to switch the braking mode to the stability priority mode and to perform control of the stability priority mode.

* * * * *